United States Patent [19]
Robinson et al.

[11] Patent Number: 5,850,584
[45] Date of Patent: Dec. 15, 1998

[54] METHOD FOR DETERMINING PRINTING JOB PARAMETERS BASED ON IMAGE QUALITY AND MATERIAL USAGE

[75] Inventors: David C. Robinson, Penfield; Louis O. Pepin, Pittsford; James D. Parker, Rochester, all of N.Y.

[73] Assignee: Xerox Corporation, Stamford, Conn.

[21] Appl. No.: 58,873

[22] Filed: Apr. 13, 1998

[51] Int. Cl.[6] .................................................. G03G 21/00
[52] U.S. Cl. .............................. 399/79; 399/81; 358/504; 358/518
[58] Field of Search ................................. 399/79, 75, 81, 399/38, 39; 358/504, 518, 519, 520, 521

[56] References Cited

U.S. PATENT DOCUMENTS

| | | | |
|---|---|---|---|
| 4,134,341 | 1/1979 | Weigele et al. | |
| 5,160,969 | 11/1992 | Mizuma et al. | 355/326 |
| 5,383,129 | 1/1995 | Farrell | 364/464.01 |
| 5,606,395 | 2/1997 | Yang et al. | 399/81 |
| 5,649,071 | 7/1997 | Klassen et al. | 395/109 |
| 5,710,824 | 1/1998 | Mongeon | 382/162 |

*Primary Examiner*—Richard Moses

[57] ABSTRACT

In color printing the quality of the image reproduced depends upon factors which include the type of image processing chosen, which affects the amount of colorant consumed; the type of paper used, uncoated or coated; and optional coatings applied thereto. The cost of a printing job can be significantly affected by the amount of colorant and the quality of paper used. A method of changing the factors affecting image quality and determining the cost of the job based on the output image quality is disclosed. This method allows a customer to choose the desired image quality versus cost trade-offs for a printing job.

20 Claims, 3 Drawing Sheets

METHOD FOR DETERMINING PRINTING JOB PARAMETERS BASED ON IMAGE QUALITY AND MATERIAL USAGE

This invention relates to a method of determining printing job parameters based on desired image quality versus the cost of materials to be used. This will allow a customer to make informed decisions regarding the image quality to be reproduced by a printing job based on the cost of materials needed for a particular image quality.

Full color printing has become a desired goal of office products. Digital printing machines typically provide operators with the ability to adjust print appearance before the start of a print run. For example, color adjustments allow operators to optimize print appearance of output copies. In color printing the quality of the image reproduced depends upon factors which include the type of image processing chosen, which affects the amount of marking materials consumed; the type of paper used, uncoated or coated; and optional coatings applied thereto. The cost of a printing job can be significantly affected by the amount of marking material and the quality of paper used.

Color printing is accomplished by providing multiple layers, or separations, of ink on a page. The amount and type of marking material used to reproduce a color image can be controlled by the printer operator by changing parameters in the image processing system of the printer. Changing the image processing parameters results in different quality color output. For example, colors are commonly provided by subtractive combinations of cyan (C), magenta (M) and yellow (Y) inks. In three-color printing a combination of equal amounts of C, M, and Y is printed to produce black. Black (K) can be added and substituted (commonly known as undercolor removal (UCR) or gray component replacement (GCR)) to print a single layer of black ink as a substitute for the combination of equal amounts of C, M, and Y. Other reasons for adding black include changing the density and gamut of the image to be printed. For a full discussion of UCR/GCR and its application to electronically derived or created images, reference is made to J.A.C. Yule, Principles of Color Reproduction. (John Wiley & Sons, Inc., New York, 1967), Pages 294–327. Being able to substitute/add black to color images greatly reduces the amount of the other colors need to reproduce a color image, however black addition can result in dark and muddy images and the addition of black must be carefully controlled.

The type of paper used to print the color image also affects the quality of the reproduced image, with coated paper generally considered as producing a better quality color image independent of the image processing used. Of course, coated paper is more expensive than uncoated paper and trading off different image processing material requirements and the type of paper used can be done to produce a particular image quality.

Currently, customers can predict marking material cost by using the average cost of a job on a printing device with particular job categories such as entirely text, 10% area halftones, 25% halftones, etc. specified by the print shop. However, these types of categories do not reflect the fact that image processing parameters can be easily varied, for example by varying the amount UCR/GCR used in a printing job as described above. It is desirable to have a quantitative method to access the cost of materials versus quality trade-offs for image quality reproduction in printing jobs so that the customer can make informed decisions with respect to the type of printing job to be run.

The following disclosures may be relevant to various aspects of the present invention:

U.S. Pat. No. 5,160,969
Inventor: Mizuma et al.
Issued: Nov. 3, 1992

U.S. Pat. No. 5,606,395
Inventor: Yang et al.
Issued: Feb. 25, 1997

U.S. Pat. No. 5,649,071
Inventor: Klassen et al.
Issued: Jul. 15, 1997

U.S. Pat. No. 5,710,824
Inventor: Mongeon
Issued: Jan. 20, 1998

Some relevant portions of the foregoing disclosures may be briefly summarized as follows:

U.S. Pat. No. 5,160,969 teaches a color xerographic printing machine which uses cyan, magenta, yellow and black to produce color images. As part of the image processing of the print engine, color and text portions of a page to be reproduce are identified and different developing material is applied depending upon the type of image to be reproduced.

U.S. Pat. No. 5,606,395 discloses a digital color printing system using an input device for changing the image processing parameters such as under color removal and gamma characteristics of a rasterized image. U.S. Pat. No. 5,649,071 teaches an image processing method which reduces the marking material coverage required in a color printing process. U.S. Pat. No. 5,710,824 discloses a color printing system which uses paper type/quality characteristic information in the image processing system of the print engine.

All of the above cited references are hereby incorporated by reference.

SUMMARY OF THE INVENTION

The present invention is drawn to a method which determines the cost for a particular printing job based on the type of image processing, paper and/or optional finishes used to produce a particular image quality. This method allows the user to make several proofs with different settings of image processing, paper and/or finishings with a job cost estimation for each setting. The inherent properties of digital printing allows rapid setting changes based on customer requirements. Using this method, the customer can make informed decisions regarding image quality reproduction versus cost for the job. Customer satisfaction will be increased due to a better understanding of cost versus image quality trade-off. Neither the customer nor the print machine operator need have knowledge of the complex image processing techniques which affect the reproduced image's image quality.

BRIEF DESCRIPTION OF THE DRAWINGS

Other features of the present invention will become apparent as the following description proceeds and upon reference to the drawings, in which.

DETAILED DESCRIPTION OF THE INVENTION

Figure 1:
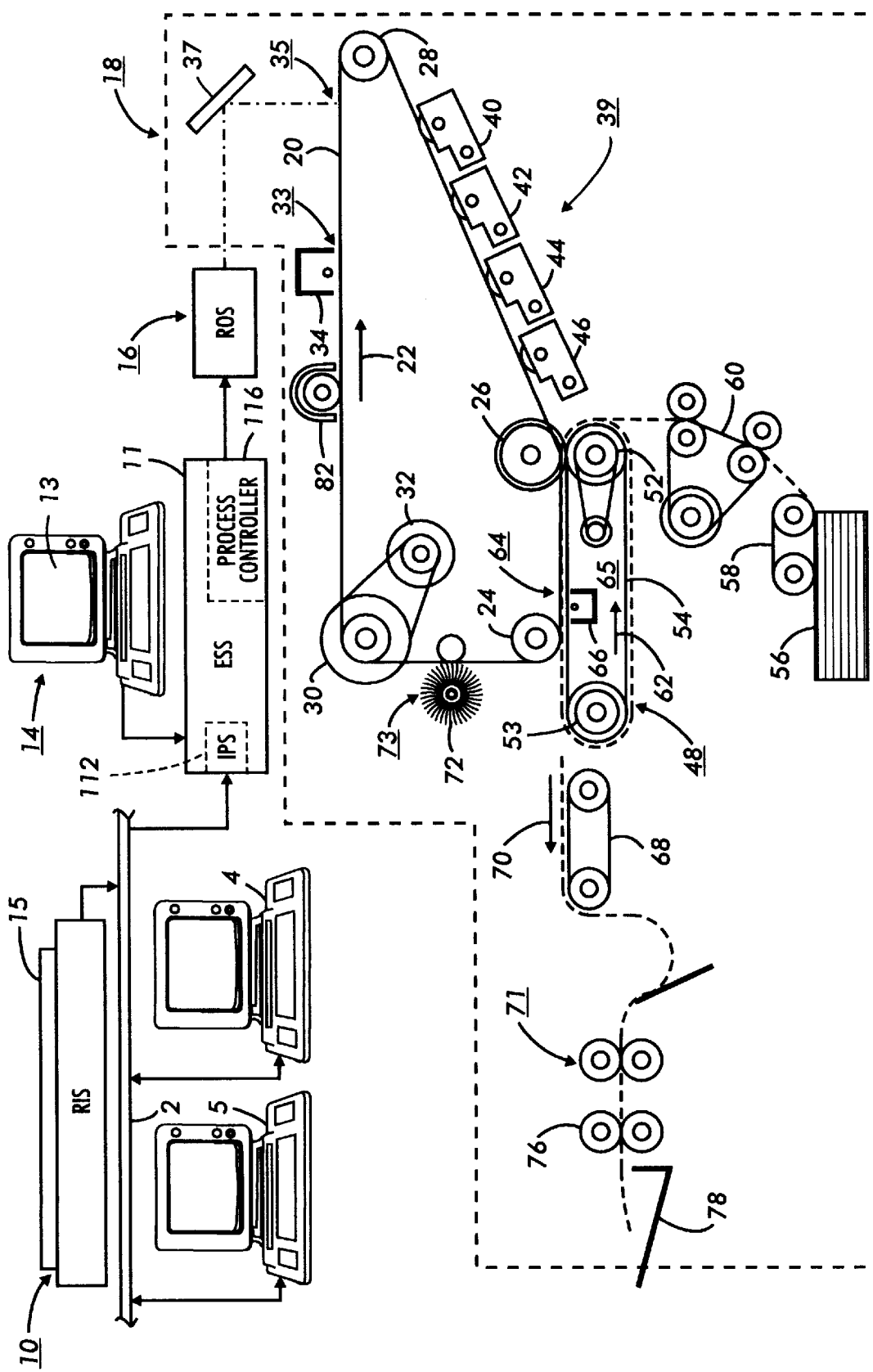
FIG. 1 is a schematic elevational view depicting an illustrative color electrophotographic printing machine incorporating the present invention.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims. Referring initially to FIG. 1 where there is shown a color electrophotographic printing machine incorporating the present invention.

To begin by way of general explanation, FIG. 1 is a schematic elevational view showing a color multi-pass electrophotographic printing machine incorporating features of the present invention. A control section, indicated generally by the reference numeral 11, is known as an electronic subsystem (ESS). ESS 11 includes an image processing station (IPS) 112 and a process controller 116 which contains data processing and control electronics to prepare and manage flow of image data to a raster output scanner (ROS), indicated generally by the reference numeral 16. A user interface (UI) 14 is in communication with ESS 11. In addition, a network 2 of one or more workstations 4 or print servers 5 also interface and communicate with ESS 11.

UI 14 enables an operator to control and monitor various operator adjustable functions and maintenance activities. The operator actuates the appropriate keys on UI 14 to adjust the parameters of a print job. UI 14 may be a touch screen, or any other suitable control panel, providing an operator interface with the system. The output signal from UI 14 is transmitted to ESS 11. ESS 11 is a programmable microprocessor system, as exemplified by U.S. Pat. No. 4,475,156 and its references which are hereby incorporated by reference. ESS 11 conventionally controls all machine steps and functions described herein, and others, including the operation of document feeders, document and print sheet deflectors or gates, sheet feeder drives, downstream finishing devices, etc. Conventional path sensors or switches may be utilized to help keep track of the position of the documents and the print sheets and the moving components of printer 18 by connection to the ESS 11.

As further shown in FIG. 1, a multiple color document 15 may be positioned on a raster input scanner (RIS), indicated generally by the reference numeral 10. The RIS 10 may be directly connected to ESS 11 or indirectly through network 2. The RIS contains document illumination lamps, optics, a mechanical scanning drive, and a charge coupled device (CCD array) or full width color scanning array. RIS 10 captures the entire image from document 15 and converts it to a series of raster scan lines and moreover measures a set of primary color densities, i.e., red, green and blue (RGB) densities, at each point of the document. RIS 10 may provide data on the scanned image to IPS 112, which may be displayed at UI 14 on a display screen 13. Additionally, IPS 112 may receive digital or electronic images from a networked workstation 4 or print server or raster input processor 5.

Documents transmitted from workstation 4 to ESS 11 are electronically generated or retrieved from any number of devices including computer tape, CD ROM, floppy disks, etc. IPS 112, which is discussed in detail below, receives a contone image and decomposes the contone image to a raster Image. IPS 112 transmits signals corresponding to the desired electronic or scanned image to ROS 16 to create the output print image. ROS 16 preferably includes a laser which may be a solid state device with a rotating polygon mirror. The ROS 16 illuminates, via mirror 37, the charged portion of a photoconductive belt 20 of printer 18 at a rate of about 400 pixels per inch to achieve a set of subtractive primary latent images. The ROS 16 will expose the photoconductive belt 20 to record three or four latent images which correspond to the signals transmitted from IPS 112. One latent image is developed with cyan developer material. Another latent image is developed with magenta developer material and the third latent image is developed with yellow developer material. A black latent image may be developed in lieu of, or in addition to, other (colored) latent images. These developed images are transferred to a print sheet in superimposed registration with one another to form a multicolored image on the print sheet. This multicolored image is then fused to the print sheet forming a color print.

With continued reference to FIG. 1, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential. Next, the charged photoconductive surface is rotated to an exposure station, indicated generally by the reference numeral 35. Exposure station 35 receives a modulated light beam corresponding to information derived by RIS 10 having multicolored document 15 positioned thereat. The modulated light beam impinges on the surface of photoconductive belt 20. The beam illuminates the charged portion of the photoconductive belt to form an electrostatic latent image. The photoconductive belt is exposed three or more times to record three or more latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44, and 46. The developer units are of a type generally referred to in the art as "magnetic development subsystems." Typically, a magnetic donor development system employs a magnetizable developer material including magnetic carrier granules having toner particles adhering triboelectrically thereto. The developer material is continually brought through a directional flux field to form a donor of developer material. The developer material is constantly moving so as to continually provide the donor with fresh developer material. Development is achieved by bringing the donor of developer material in sufficiently close vicinity of the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white document as well as color images. The image processing system 112 performs under color removal which recognizes that black toner can be substituted for a portion of cyan, magenta, and yellow toner. Under color removal is a technique for reducing the amount of magenta, yellow, and cyan in neutral areas and replacing them with an appropriate amount of black. Black addition can also be used to extend the gamut of the printer and to provide greater image density which can greatly affect the reproduced image quality.

Each of the developer units is moved into and out of an operative position. In the operative position, the magnetic donor is substantially adjacent the photoconductive belt, while in the nonoperative position, the magnetic donor is spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as uncoated or coated paper. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 52 and 53. A sheet gripper (not shown) extends between belts 54 and moves in unison therewith. A sheet is advanced from a stack of sheets 56 disposed on a tray. A friction retard feeder 58 advances the uppermost sheet from stack 56 onto a pre-transfer transport 60. Transport 60 advances the sheet to sheet transport 48. The sheet is advanced by transport 60 in synchronism with the movement of the sheet gripper. In this way, the leading edge of the sheet arrives at a preselected position or loading zone to be received by the open sheet gripper. The sheet gripper then closes securing the sheet thereto for movement therewith in a recirculating path. The leading edge of the sheet (not shown) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another. A sheet may move in a recirculating path for four cycles when under color black removal is used.

Each of the electrostatic latent images recorded on the photoconductive surface is developed with the appropriately colored toner and transferred, in superimposed registration with one another, to the sheet to form the multicolored copy of the colored document. After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to an output tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

Turning now to the present invention, with input from the operator by the UI 14, the image processing parameters of IPS 112 can be changed to produce different types/quality of images, which can be displayed on the UI 14 prior to printing. Using this ability to change image processing techniques, a range of image processing settings can be selected by the operator for a particular job or page. The cost of a particular job or page can be determined based upon the amount of materials consumed for that job. For example, the job may be displayed with different UCR/GCR levels accompanied by the colorant material cost per job/page/etc. The customer can then make a determination of the quality versus cost trade-off of the image to be reproduced based on the image processing parameters chosen.

The sophistication of the cost model can vary considerably depending on the desired accuracy of the results and the amount of computing resources available to execute the model. An accurate model may require 3-dimensional finite element modeling of all the relevant parameters. However, simpler models can produce useful results.

One example of one of the simple models is described as follows:

The area coverage for each separation for each UCR/GCR level is determined by analyzing the Raster Image Processed (RIP) file to be printed as processed by the IPS 112. The area coverage for each colorant can be determined by two possible methods:

For a binary RIP, the colorant area coverage would be between pixels printed versus the possible pixels that could be printed. For a contone RIP, the colorant area coverage would be between gray level(s) to be printed versus the possible gray level(s) that could be printed. Determining the amount of colorant to be used based on the image to be printed is well-known and taught in U.S. Pat. Nos. 5,204,698, 5,204,699 and 5,349,377, all of which are hereby incorporated by reference.

Once the area coverage for each color separation is determined, the cost per page based on the image processing parameters is calculated by (1) multiplying the average colorant mass by the colorant area coverage for each color separation (C, M, Y, K); (2) multiplying by the cost of the colorant (e.g. toner) per unit mass of each color separation to obtain the cost of each color separation; and (3) adding the costs of each of the color separations. Of course, the average colorant mass and cost per unit mass for each colorant must be entered in the printing machine by the machine operator prior to the cost per colorant calculations.

In addition to the standard CMYK colorants used, non-standard or special colorants such as green and orange can be used to extend the printer gamut. When these additional colors are used to produce a color image, the image processing must take these additional colorants into consideration in making each color separation. Another use of a non-standard colorant is for printing where a particular shade of a color which is difficult to reproduce using the standard CMYK combinations is provided as a colorant. The non-standard colorant reduces the amount of standard colorants used to produce the desired image color.

Figure 2:
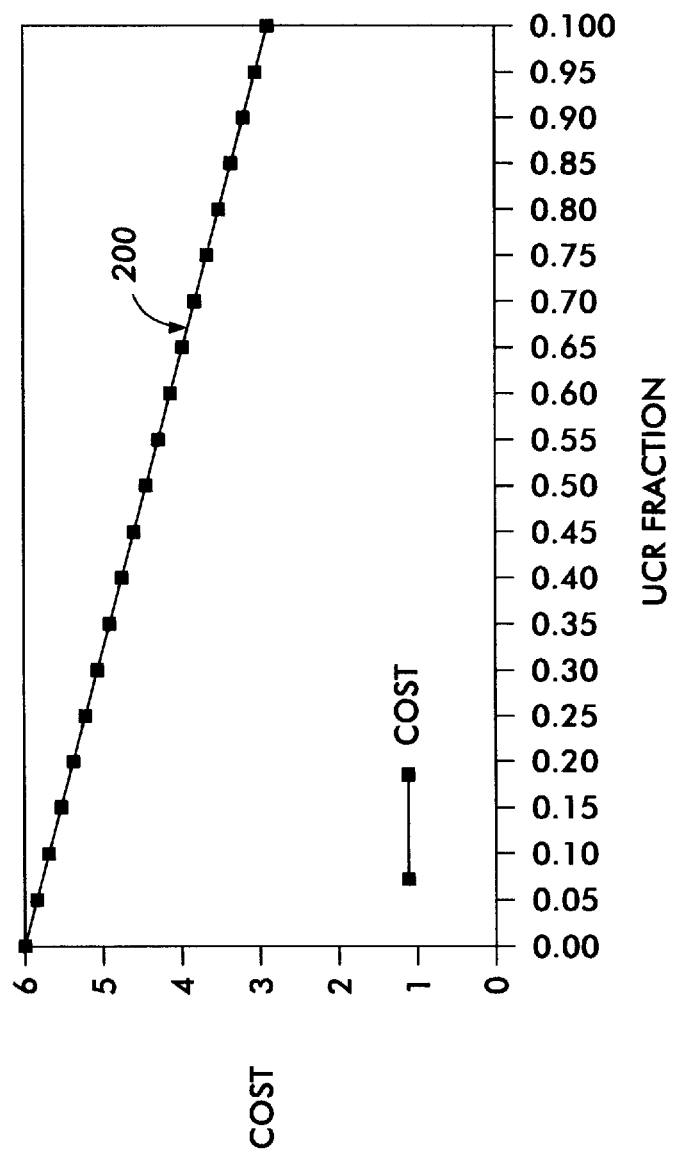
FIG. 2 is a graph of cost of colorant materials versus percentage of undercolor removal.

FIG. 2 shows a graph of total colorant cost for a particular job versus the percentage of UCR used to produce a particular image producing cost curve 200. As explained above, using black to replace the CMY in a color image by UCR results in a less expensive print, however at a certain point image quality degradation becomes unacceptable with increasing black addition.

Figure 3:
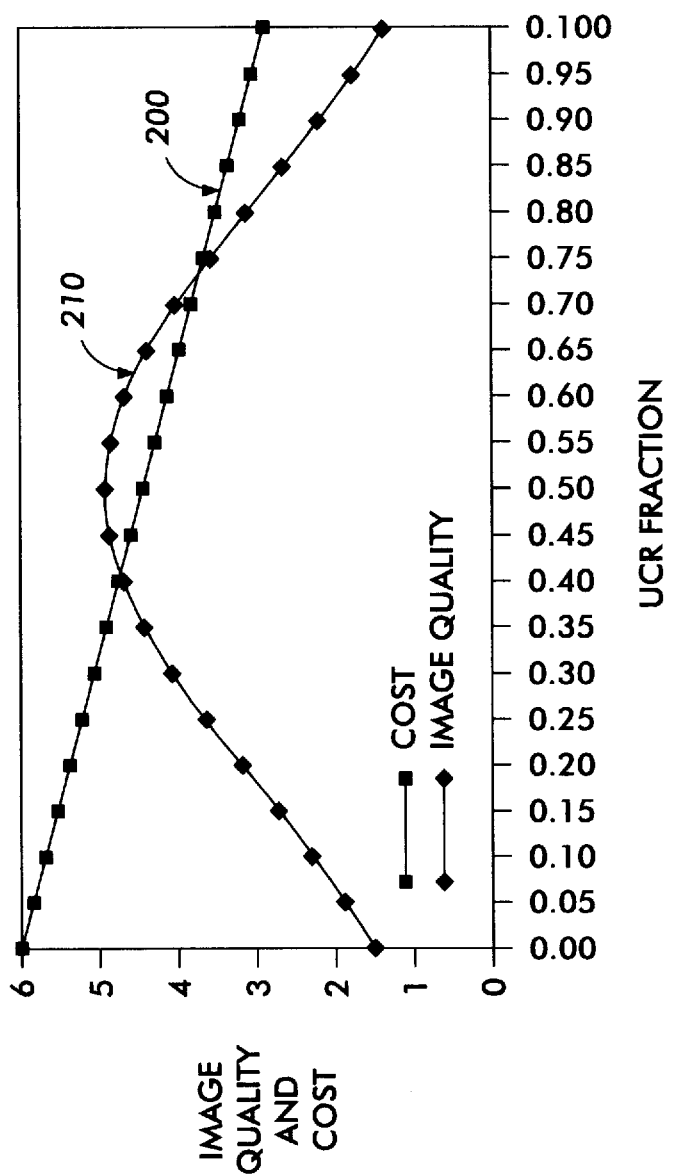
FIG. 3 is a graph of image quality versus percentage of undercolor removal with an overlay of cost of colorant materials.

Another method of determining the cost per page based on the type of image processing used is to model image quality using pre-existing qualified observer judgments of image quality for different UCR/GCR settings. This needs to be done for each different image type, e.g., pictorial images and text images. A qualified observer curve 210 is shown in FIG. 3. The qualified observer curve can be shown to the customer to enable them to make qualified trade-offs of image quality versus cost. The cost curve 200 computed by the previous area coverage method can super-imposed on the graph shown in FIG. 3. Based on this information, the customer can choose the desired trade-off level, for example, to the right of the maximum value of image quality at a cost associated with the minimum acceptable value of image quality. Of course, other image processing characteristics besides UCR/GCR can be changed to affect output image quality such as TRC, type of halftone used, etc., UCR/GCR being only one example of many image processing techniques which affect the amount of colorant materials used for a particular job.

The cost of the paper to be used for the job can also be included in the image quality versus cost trade-off determination. In the simple cost calculation, the additional cost of the paper, for example coated versus uncoated, can be added to the colorant cost curve shown in FIG. 2. The characteristics, for example roughness and reflectivity, of the types of papers available which will affect the output image quality can be added to the IPS 112 functions. The qualified observer curve of FIG. 3 could then be updated to include the image quality effects of the chosen paper characteristics. The optimum type of paper could also automatically be chosen based on the amount/type of colorant to be used to produce the color image which can be supported by the teachings U.S. Pat. No. 5,502,555, which is hereby incorporated by reference.

Occasionally, it is desirable to have additional finishing coatings on color prints as disclosed for example in U.S. Pat. No. 5,260,753, which is hereby incorporated by reference. Again the cost curves and qualified observer curves can be updated based on the cost of the finishing and the effect the finishing has on the image quality of the reproduced image.

It is, therefore, apparent that there has been provided in accordance with the present invention, a method of enabling job trade-offs for image quality versus the cost of the job that fully satisfies the aims and advantages hereinbefore set forth. While this invention has been described in conjunction with a specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method for determining an output image to be reproduced by a color printing machine based on image quality versus cost trade-offs for a job comprising:

inputting a color original image using raster image processing into an image processing system of the printing machine;

changing at least one image processing parameter in the image processing system which affects the image quality of the output image;

determining the cost of materials to be consumed based on the change of the at least one image processing parameter; and selecting an output image based on a desired image quality and cost for the job.

2. The method as claimed in claim 1, further comprising:
displaying the output image on a display screen connected to the printer after the at least one image processing parameter has been changed.

3. The method as claimed in claim 1, further comprising:
varying the at least one image processing parameter over a range of image processing parameter values; each image processing parameter value having a cost of materials is associated with each value; and graphically depicting the range of image processing parameter values and the cost of materials associated with each value.

4. The method as claimed in claim 1, wherein the at least one image processing parameter to be changed affects an amount of a black colorant added by the image processing system.

5. The method as claimed in claim 4, wherein the at least one image processing parameter to be changed includes a type of paper to be used in the job.

6. The method as claimed in claim 1, wherein the at least one image processing parameter to be changed is a type of paper to be used in the job.

7. The method as claimed in claim 1, wherein at least one image processing parameter to be changed is a type of finishing to used.

8. The method as claimed in claim 1, wherein determining the cost of materials further comprises:

determining cyan area coverage, multiplying the cyan area coverage by the average cyan colorant mass to determine the mass of cyan colorant to be used and multiplying the cyan colorant mass by the cost of cyan colorant per mass of cyan colorant to obtain the cost of cyan colorant to be used;

determining magenta area coverage, multiplying the magenta area coverage by the average magenta colorant mass to determine the mass of magenta colorant to be used and multiplying the magenta colorant mass by the cost of magenta colorant per mass of magenta colorant to obtain the cost of magenta colorant to be used;

determining yellow area coverage, multiplying the yellow area coverage by the average yellow colorant mass to determine the mass of yellow colorant to be used and multiplying the yellow colorant mass by the cost of yellow colorant per mass of yellow colorant to obtain the cost of yellow colorant to be used;

determining black colorant area coverage, multiplying the black area coverage by the average black colorant mass to determine the mass of black colorant to be used and multiplying the black colorant mass by the cost of black colorant per mass of black colorant to obtain the cost of black colorant to be used; and adding the costs of cyan colorant, magenta colorant, yellow and black colorants to provide the cost of total standard colorants to be used.

9. The method as claimed in 8, wherein determining the cost of materials further comprises:

determining a special colorant area coverage, multiplying the special color area coverage by the average special colorant mass to determine the mass of special colorant to be used and multiplying the colorant mass by the cost of special colorant per mass of special colorant to obtain the cost of special colorant to be used; and adding the cost of the special colorant to the cost of total standard colorants to provide the cost of total colorants to be used.

10. The method as claimed in claim 1, wherein the job is a single page.

11. The method as claimed in claim 1, further comprising:

predetermining qualified observer judgment values of image quality based on the at least one image processing parameter.

12. The method as claimed in claim 11, further comprising:

varying the at least one image processing parameter over a range of image processing parameter values; each image processing parameter value having a qualified observer judgment value associated therewith; and graphically depicting the range of image processing parameter values and the qualified observer judgment values associated therewith.

13. The method as claimed in claim 12, further comprising:

associating a cost of materials value with each image processing parameter value; and graphically depicting the cost of material values with the image processing values and qualified observer judgment values.

14. The method as claimed in claim 1, whereby the at least one image processing parameter is changed using a user interface on the color printing machine.

15. A method for determining an output image to be reproduced by a color printing machine based on image quality versus cost trade-offs for a job comprising:

inputting a color original image using raster image processing into an image processing system of the printing machine;

varying at least one image processing parameter in the image processing system which affects the image quality of the output image, the at least one image processing parameter being varied over a range of image processing parameter values with each image processing parameter value having a cost of materials associated therewith;

graphically depicting the at least one image processing parameter values and the cost of materials associated therewith;

selecting an output image based on a desired image quality and cost for the job.

16. The method as claimed in claim 15, further comprising:

predetermining a qualified observer judgment value for each of the at least one image processing parameter values; and graphically depicting qualified observer judgment value with the at least one image processing parameter values and cost of material values associated therewith.

17. The method as claimed in claim 16, further comprising:

selecting a desired image processing parameter value and cost of material value; and displaying a preview output image based on the selected image processing parameter value and cost of material value.

18. The method as claimed in claim 16, wherein the cost of materials includes the cost of colorants used.

19. The method of claim 18, wherein the cost associated with each image processing parameter value includes:

determining a cyan area coverage, multiplying the cyan area coverage by the average cyan colorant mass to determine the mass of cyan colorant to be used and multiplying the cyan colorant mass by the cost of cyan colorant per mass of cyan colorant to obtain the cost of cyan colorant to be used;

determining a magenta area coverage, multiplying the magenta area coverage by the average magenta colorant mass to determine the mass of magenta colorant to be used and multiplying the magenta colorant mass by the cost of magenta colorant per mass of magenta colorant to obtain the cost of magenta colorant to be used;

determining a yellow area coverage, multiplying the yellow area coverage by the average yellow colorant mass to determine the mass of yellow colorant to be used and multiplying the yellow colorant mass by the cost of yellow colorant per mass of yellow colorant to obtain the cost of yellow colorant to be used;

determining a black colorant area coverage, multiplying the black area coverage by the average black colorant mass to determine the mass of black colorant to be used and multiplying the black colorant mass by the cost of black colorant per mass of black colorant to obtain the cost of black colorant to be used; and adding the costs of cyan, magenta colorant, yellow and black colorants to provide the cost of total colorants to be used.

20. The method as claimed in claim 16, wherein the cost of materials includes the cost of a type of paper used.

* * * * *